(12) United States Patent
Maimon et al.

(10) Patent No.: US 9,614,574 B2
(45) Date of Patent: Apr. 4, 2017

(54) INTEGRATED TRANSMIT/RECEIVE SWITCH

(71) Applicant: Intel Corporation, Santa Clara, CA (US)

(72) Inventors: Tzvi Maimon, Haifa (IL); Ofir Degani, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/815,393

(22) Filed: Jul. 31, 2015

(65) Prior Publication Data

US 2016/0182120 A1  Jun. 23, 2016

Related U.S. Application Data

(63) Continuation of application No. 14/183,059, filed on Feb. 18, 2014, now Pat. No. 9,118,397, which is a continuation of application No. 12/949,008, filed on Nov. 18, 2010, now Pat. No. 8,712,342.

(51) Int. Cl.
| | |
|---|---|
| *H04B 1/18* | (2006.01) |
| *H04B 1/48* | (2006.01) |
| *H04B 1/04* | (2006.01) |
| *H04B 1/44* | (2006.01) |
| *H04W 88/06* | (2009.01) |

(52) U.S. Cl.
CPC ............. *H04B 1/48* (2013.01); *H04B 1/0458* (2013.01); *H04B 1/18* (2013.01); *H04B 1/44* (2013.01); *H04W 88/06* (2013.01)

(58) Field of Classification Search
CPC .................................................. H04B 1/0458
See application file for complete search history.

(56) References Cited

U.S. PATENT DOCUMENTS

| | | | | |
|---|---|---|---|---|
| 7,283,793 | B1* | 10/2007 | McKay | ................ H04B 1/0458 333/103 |
| 7,468,638 | B1* | 12/2008 | Tsai | ........................ H04B 1/48 331/126 |
| 7,756,486 | B1* | 7/2010 | Tan | ........................ H04B 1/525 323/222 |
| 2002/0101907 | A1* | 8/2002 | Dent | ........................ H03F 3/24 375/132 |
| 2011/0105023 | A1* | 5/2011 | Scheer | ................... H01Q 1/242 455/41.2 |
| 2011/0273355 | A1* | 11/2011 | Ahn | ........................ H01Q 3/24 343/860 |

* cited by examiner

*Primary Examiner* — David Bilodeau
(74) *Attorney, Agent, or Firm* — Alpine Technology Law Group, LLC

(57) ABSTRACT

An apparatus comprises a transmit network to transmit an input from a first amplifier to an antenna, a receive network to provide an input from an antenna to a second amplifier, a first switch to selectively decouple the transmit network from the antenna, and a second switch to selectively decouple the receive network from the antenna. Other embodiments may be described.

22 Claims, 6 Drawing Sheets

INTEGRATED TRANSMIT/RECEIVE SWITCH

RELATED APPLICATIONS

The present application is a continuation of U.S. patent application Ser. No. 14/183,059, filed on Feb. 18, 2014, entitled "INTEGRATED TRANSMIT/RECEIVE SWITCH, which is a continuation of U.S. patent application Ser. No. 12/949,008, filed on Nov. 18, 2010, entitled "INTEGRATED TRANSMIT/RECEIVE SWITCH", the disclosures of which are hereby incorporated herein by reference in its entirety and for all purposes.

BACKGROUND

The subject matter described herein relates generally to the field of electronic communication and more particularly to transmit/receive switches which may be used in electronic devices.

Many electronic devices such as notebook and laptop computers, personal digital assistants (PDAs), and the like include one or more wireless transceivers to send and receive data via wireless networks. Multi-mode devices, which can transceiver data on multiple different wireless networks, may share hardware, e.g., transmitters, receivers, antennas, etc., in order to reduce both the cost and size of a device. Further, in some modulation schemes the transmitter operates on one frequency and the receiver operates on a separate frequency, and a duplexer may be used to separate the frequencies. In a time-duplex-division scheme the transmission and receive functions may be separated in time.

These schemes may utilize a switching device to switch a transceiver between a transmit mode and a receive mode. Accordingly, switching arrangements in a wireless transceiver may find utility.

BRIEF DESCRIPTION OF THE DRAWINGS

The detailed description is described with reference to the accompanying figures.

DETAILED DESCRIPTION

In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1A:
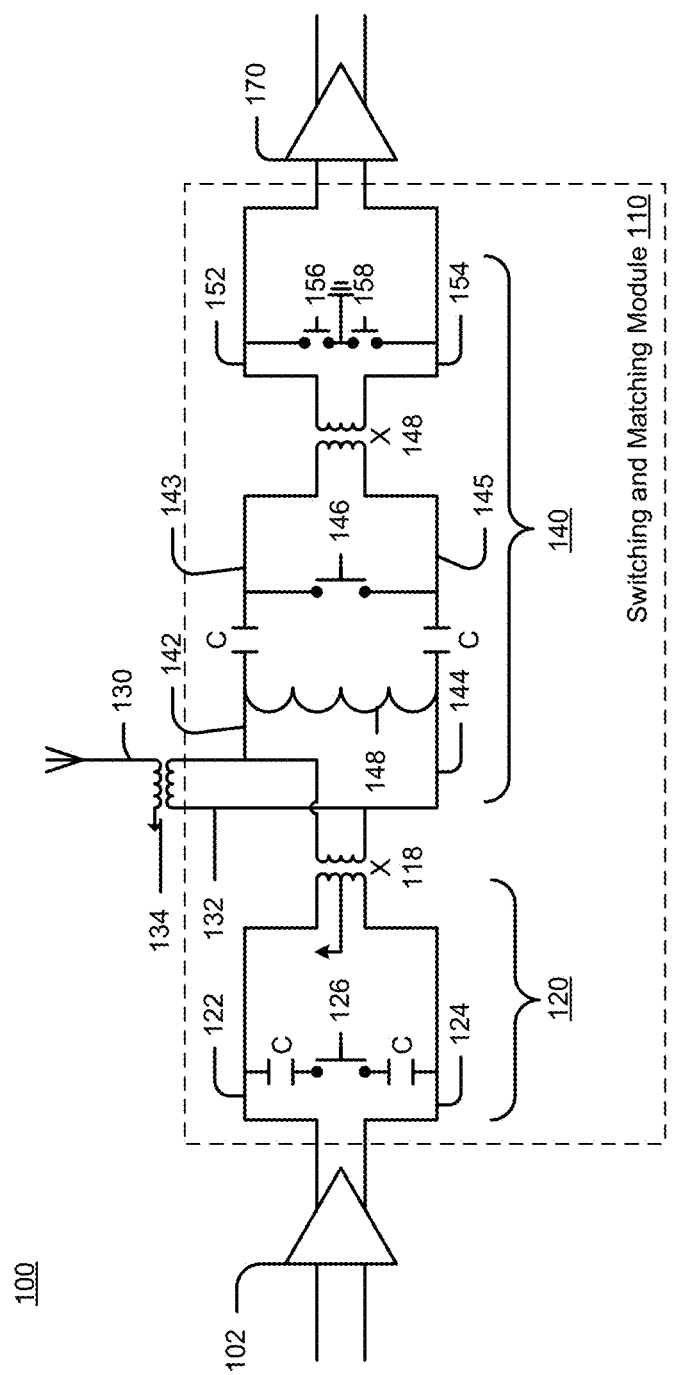
FIGS. 1A-1C are schematic illustrations of a power amplifier module including an integrated transmit/receive switching module in accordance with some embodiments.
Figure 1B:
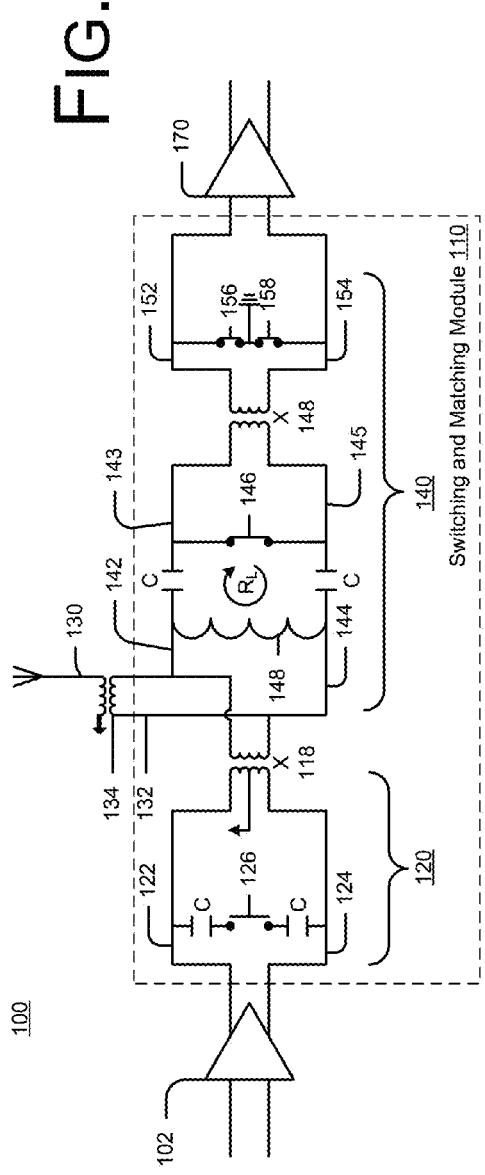
Figure 1C:
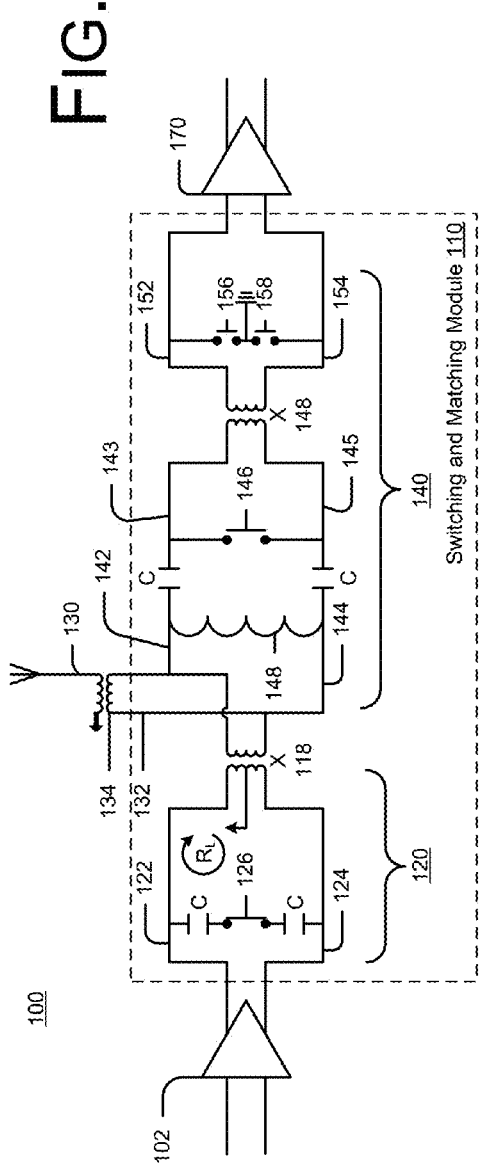

FIGS. 1A-1C are schematic illustrations of a power amplifier module 102 a low noise amplifier 170 and an integrated transmit/receive switching module 110. Referring to FIG. 1A, in some embodiments a transmit/receive module 100 includes a power amplifier 102, a switching and matching module 110, and a low noise amplifier 170. The first amplifier 102 may be embodied as power amplifier to amplify an input electrical signal. A switching and matching module 110 is coupled to the first amplifier 102 to deliver a signal from the power amplifier 102 to the antenna 130, and is coupled to a low noise amplifier 170, which receives an output signal from the switching and matching module 110. Switching and matching module 110 is also coupled to one or more antennas 130. In the embodiment depicted in FIG. 1A the switching and matching module 110 is coupled to antenna 130 via an inductive link. One skilled in the art will recognize that the switching and matching module 110 may be coupled to antenna 130 via other types of links, e.g., via a direct electrical connection to antenna 130.

In the embodiment depicted in FIG. 1A the switching and matching module 110 comprises a transmit network 120 and a receive network 140. The transmit network 120 couples the power amplifier 102 to the antenna 130, such that electrical signals output from the power amplifier 102 may be transmitted via antenna 130. The receive network 140 couples the antenna 130 to the low noise amplifier 170, such that electromagnetic signals received by antenna 130 may be deliver to the low noise amplifier 170.

In some embodiments the transmit network 120 comprises a first line 122 and a second line 124 coupled to respective first and second outputs of the first amplifier 102. The transmit network 120 and the receive network 140 are connected together to the differential input/output 132. The differential input/output 132 is connected to an antenna via a balun 134 which provides an inductive link between antenna 130 and both the transmit network 120 and the receive network 140.

The transmit network 120 comprises a first switch 126 that provides an electrical connection of capacitors between the first line 122 and the second line 124. The first switch 126 is positioned between the inductive link of the transformer 118 and the first amplifier 102. The first switch 126 is connected to the first line 122 and the second line 124 via capacitors C.

In some embodiments the receive network 140 comprises a third line 142 and fourth line 144 to couple to the antenna 130. An inductor 148 is connected to the third line 142 and fourth line 144. A capacitor C is disposed on each of the first line 142 and the second line 144 and a second switch 146 selectively connecting the capacitors C together.

In the embodiment depicted in FIG. 1A the receive network 140 is coupled to the low noise amplifier 170 via a second transformer 148, which establishes an inductive link between line 143 and line 145 and a line 152 and line 164, respectively. The fifth line 152 and sixth line 154 are input into the low noise amplifier 170. A switch 156 couples the fifth line 152 to ground and a switch 158 couples the sixth line 154 to ground.

Having described the structural components of the switching and matching module 110, attention will now to a description of operations of the switching and matching module 110. In some embodiments switching and matching module 110 operates to switch between a transmit state in which the transmit network is coupled to antenna 130 and a receive state in which the receive network 140 is coupled to antenna 130.

FIG. 1B is a schematic illustration of the transmit/receive module 100 with switching and matching module 110 in a transmit state. Referring to FIG. 1B, in a transmit state the switch 146 is closed to connect lines 143 and 145. Closing switch 146 establishes an RLC circuit in the receive network 140 such that the receive network 140 presents a parallel resonance load (i.e., high impedance) at the band frequency of the switching and matching module, thereby effectively decoupling the receive network 140 from the antenna 130. Thus, signals input from the power amplifier 102 are transmitted across the transmit network 120 to the antenna 130.

In addition, switches 156 and 158 may be closed, which connects the second amplifier 170 to ground. This isolates the receive network 140 from the transmit network 120, reduces transmission insertion loss, and reduces signal swing at the input to the low noise amplifier 170.

FIG. 1C is a schematic illustration of the transmit/receive module 100 with the switching and matching module 110 in a receive state. Referring to FIG. 1C, in a receive state the switch 126 is closed to connect lines 122 and 124 thru two capacitors. Closing switch 126 establishes an RLC circuit in the transmit network 120 such that the transmit network 120 presents a parallel resonance load (i.e., high impedance) at the band frequency of the switching and matching module 110, thereby effectively decoupling the transmit network 120 from the antenna 130.

The switches 126 and 146 define logic to switch the switching and matching module 110 between a transmit state and a receive state. Switches 156 and 158 may also be considered part of the logic to switch the switching and matching module 110 between a transmit state and a receive state as these switches improve the overall switching performance, although they are not necessary for the operation of switching and matching module 110.

Figure 2:
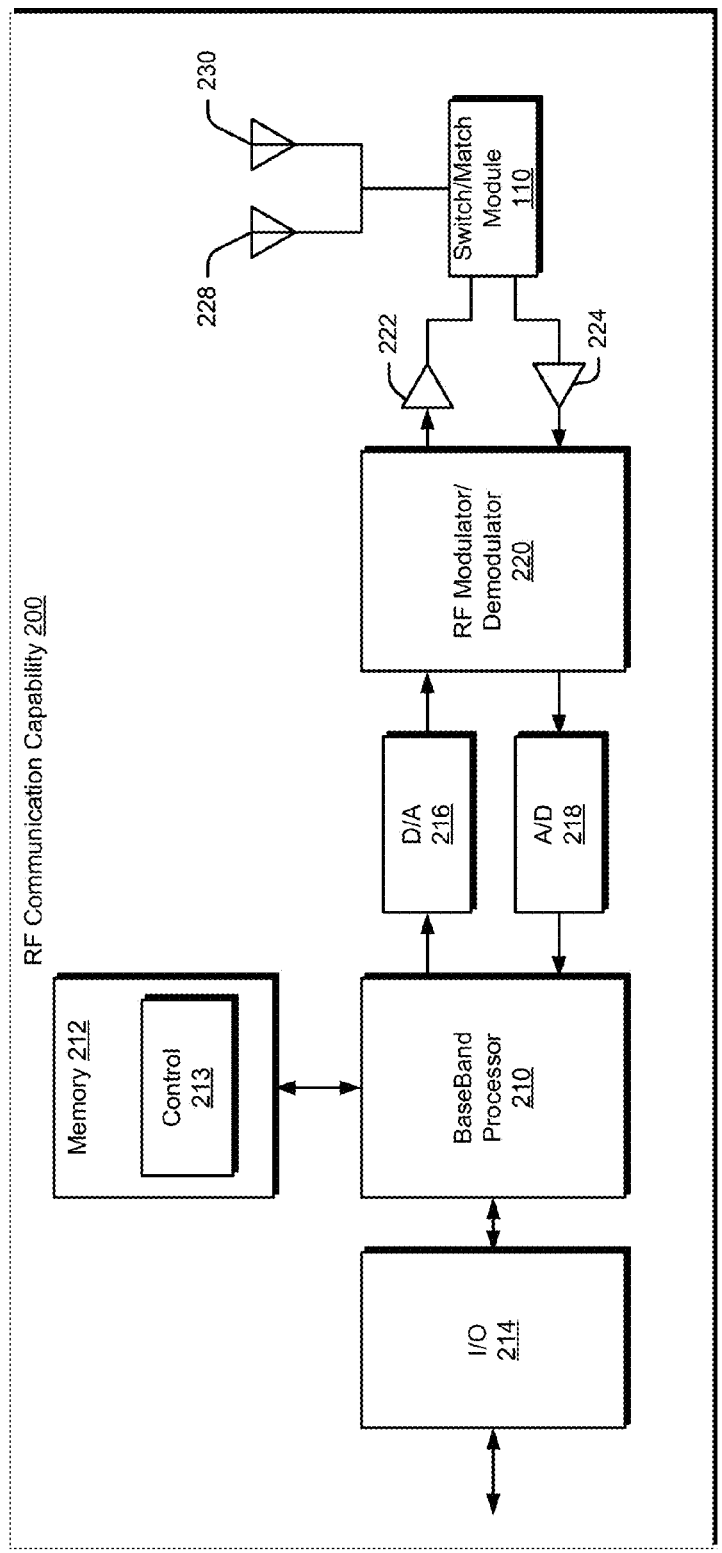
FIG. 2 is a schematic illustration of components of an electronic device, according to embodiments.

In some embodiments the switching and matching module 110 may be incorporated into the RF communication capability 200 of an electronic device. Referring now to FIG. 2, a block diagram of an RF communication capability 200 in accordance with one or more embodiments will be discussed. FIG. 2 depicts the major elements of an RF communication capability 200, however fewer or additional elements may be included in alternative embodiments in addition to various other elements that are not shown herein, and the scope of the claimed subject matter is not limited in these respects.

RF communication capability 200 may comprise a baseband processor 210 coupled to memory 212 for performing the control functions of RF communication capability. Input/output (I/O) block 214 may comprise various circuits for coupling RF communication capability to one or more other devices or components of an electronic device. For example, I/O block 214 may include one or more Ethernet ports and/or one or more universal serial bus (USB) ports for coupling RF communication capability 200 to a modem or other devices. For wireless communication, RF communication capability 200 may further include a radio-frequency (RF) modulator/demodulator 220 for modulating signals to be transmitted and/or for demodulating signals received via a wireless communication link.

A digital-to-analog (D/A) converter 216 may convert digital signals from baseband processor 210 to analog signals for modulation and broadcasting by RF modulator/demodulator 220 via analog and/or digital RF transmission techniques. Likewise, analog-to-digital (A/D) converter 218 may convert analog signals received and demodulated by RF modulator/demodulator 220 digital signals in a format capable of being handled by baseband processor 210. Power amplifier (PA) 222 transmits outgoing signals via one or more antennas 228 and/or 230, and low noise amplifier (LNA) 224 receives one or more incoming signals via antennas 228 and/or 230, which may be coupled via switching and matching module 110 as depicted in FIGS. 1A-1C to control such bidirectional communication. In one or more embodiments, RF communication capability 200 may implement single input, single output (SISO) type communication, and in one or more alternative embodiments RF communication capability may implement multiple input, multiple output (MIMO) communications, although the scope of the claimed subject matter is not limited in these respects.

Figure 3:
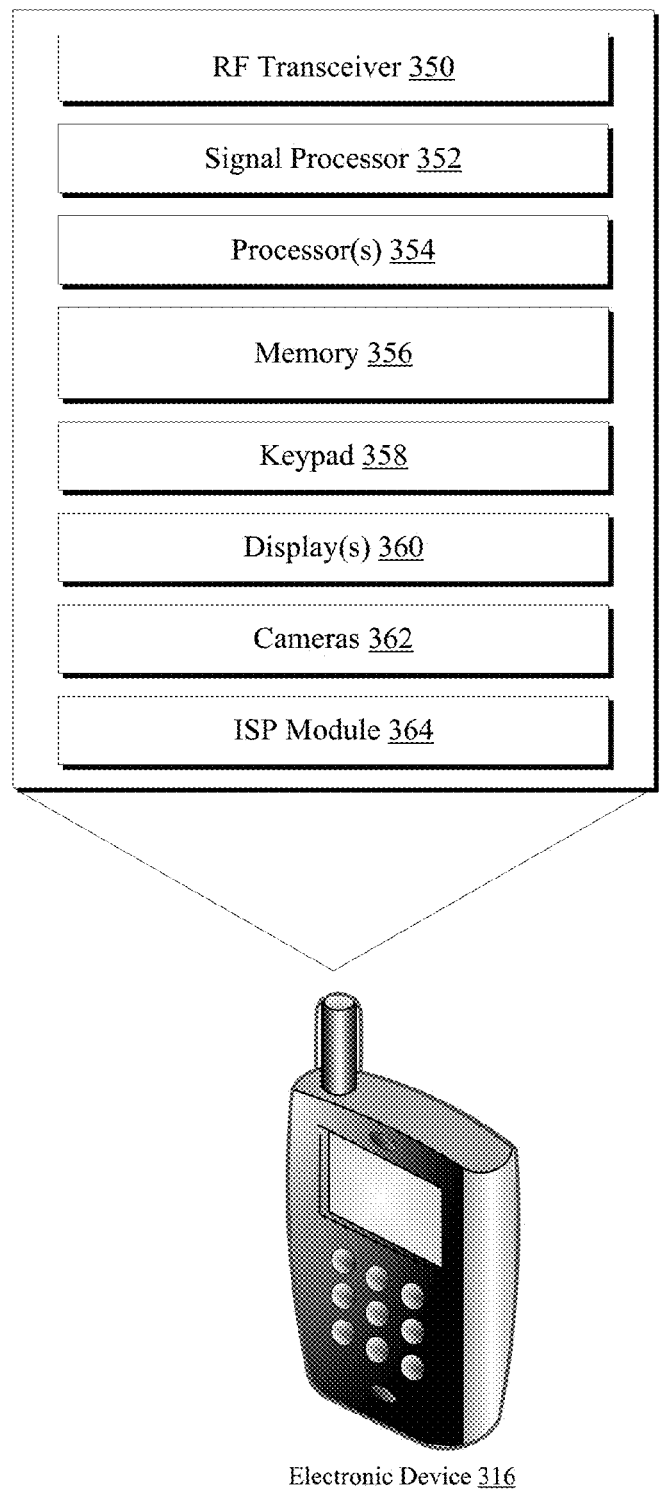
FIG. 3 is a schematic illustration of a wireless device according to some embodiments.

FIG. 3 is a schematic illustration of an electronic device 316 which includes a wireless communication capability, according to some embodiments. Referring to FIG. 3, in some embodiment s electronic device 316 may be embodied as a mobile telephone, a personal digital assistant (PDA), a laptop computer, or the like. Electronic device 316 may include an RF transceiver 350 to transceive RF signals and a signal processing module 352 to process signals received by RF transceiver 350.

RF transceiver 350 may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Electronic device 316 may further include one or more processors 354 and a memory module 356. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. In some embodiments, processor 354 may be one or more processors in the family of Intel® PXA27x processors available from Intel® Corporation of Santa Clara, Calif. Alternatively, other CPUs may be used, such as Intel's Itanium®, XEON™, ATOM™, and Celeron® processors. Also, one or more processors from other manufactures may be utilized. Moreover, the processors may have a single or multi core design. In some embodiments, memory module 356 includes random access memory (RAM); however, memory module 356 may be implemented using other memory types such as dynamic RAM (DRAM), synchronous DRAM (SDRAM), and the like.

Electronic device 316 may further include one or more input/output interfaces such as, e.g., a keypad 358 and one or more displays 360. In some embodiments electronic device 316 comprises one or more camera modules 362 and an image signal processor 364.

Figure 4:
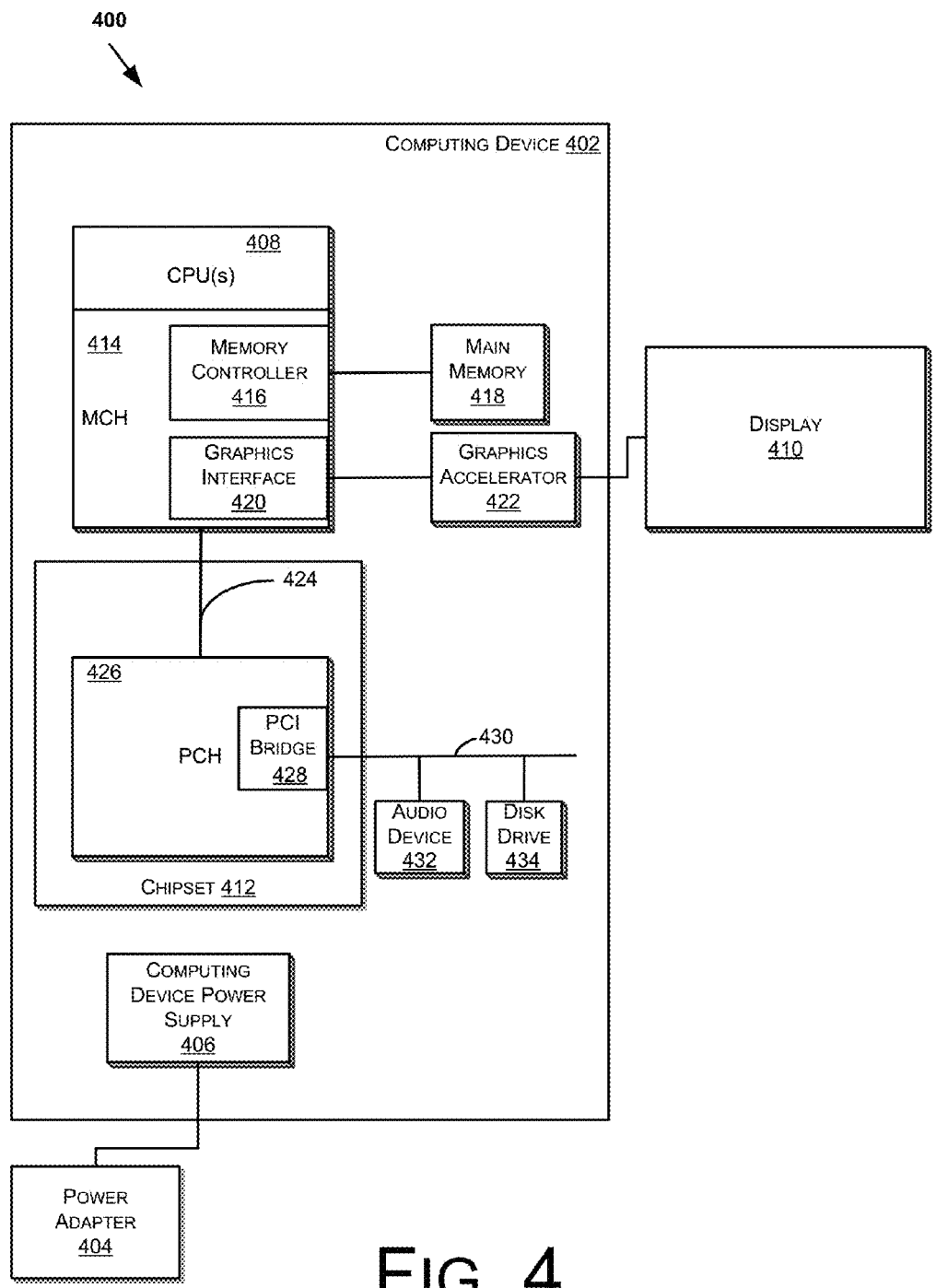
FIG. 4 is a schematic illustration of a system which may be adapted to implement thermal management, according to an embodiment.

FIG. 4 is a schematic illustration of a computer system 400 which may include a wireless communication capability in accordance with some embodiments. The computer system 400 includes a computing device 402 and a power adapter 404 (e.g., to supply electrical power to the computing device 402). The computing device 402 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 402 (e.g., through a computing device power supply 406) from one or more of the following sources: one or more battery packs, an alternating current (AC) outlet (e.g., through a transformer and/or adaptor such as a power adapter 404), automotive power supplies, airplane power supplies, and the like. In some embodiments, the power adapter 404 may transform the power supply source output (e.g., the AC outlet voltage of about 110 VAC to 240 VAC) to a direct current (DC) voltage ranging between about 7 VDC to 12.6 VDC. Accordingly, the power adapter 404 may be an AC/DC adapter.

The computing device 402 may also include one or more central processing unit(s) (CPUs) 408. In some embodiments, the CPU 408 may be one or more processors in the Pentium® family of processors including the Pentium® II processor family, Pentium® III processors, Pentium® IV, or CORE2 Duo processors available from Intel® Corporation of Santa Clara, Calif. Alternatively, other CPUs may be used, such as Intel's Itanium®, XEON™, and Celeron® processors. Also, one or more processors from other manufactures may be utilized. Moreover, the processors may have a single or multi core design.

A chipset 412 may be coupled to, or integrated with, CPU 408. The chipset 412 may include a memory control hub (MCH) 414. The MCH 414 may include a memory controller 416 that is coupled to a main system memory 418. The main system memory 418 stores data and sequences of instructions that are executed by the CPU 408, or any other device included in the system 400. In some embodiments, the main system memory 418 includes random access memory (RAM); however, the main system memory 418 may be implemented using other memory types such as dynamic RAM (DRAM), synchronous DRAM (SDRAM), and the like. Additional devices may also be coupled to the bus 410, such as multiple CPUs and/or multiple system memories.

The MCH 414 may also include a graphics interface 420 coupled to a graphics accelerator 422. In some embodiments, the graphics interface 420 is coupled to the graphics accelerator 422 via an accelerated graphics port (AGP). In some embodiments, a display (such as a flat panel display) 440 may be coupled to the graphics interface 420 through, for example, a signal converter that translates a digital representation of an image stored in a storage device such as video memory or system memory into display signals that are interpreted and displayed by the display. The display 440 signals produced by the display device may pass through various control devices before being interpreted by and subsequently displayed on the display.

A hub interface 424 couples the MCH 414 to a platform control hub (PCH) 426. The PCH 426 provides an interface to input/output (I/O) devices coupled to the computer system 400. The PCH 426 may be coupled to a peripheral component interconnect (PCI) bus. Hence, the PCH 426 includes a PCI bridge 428 that provides an interface to a PCI bus 430. The PCI bridge 428 provides a data path between the CPU 408 and peripheral devices. Additionally, other types of I/O interconnect topologies may be utilized such as the PCI Express™ architecture, available through Intel® Corporation of Santa Clara, Calif.

The PCI bus 430 may be coupled to an audio device 432 and one or more disk drive(s) 434. Other devices may be coupled to the PCI bus 430. In addition, the CPU 408 and the MCH 414 may be combined to form a single chip. Furthermore, the graphics accelerator 422 may be included within the MCH 414 in other embodiments.

Additionally, other peripherals coupled to the PCH 426 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Hence, the computing device 402 may include volatile and/or nonvolatile memory.

Figure 5:
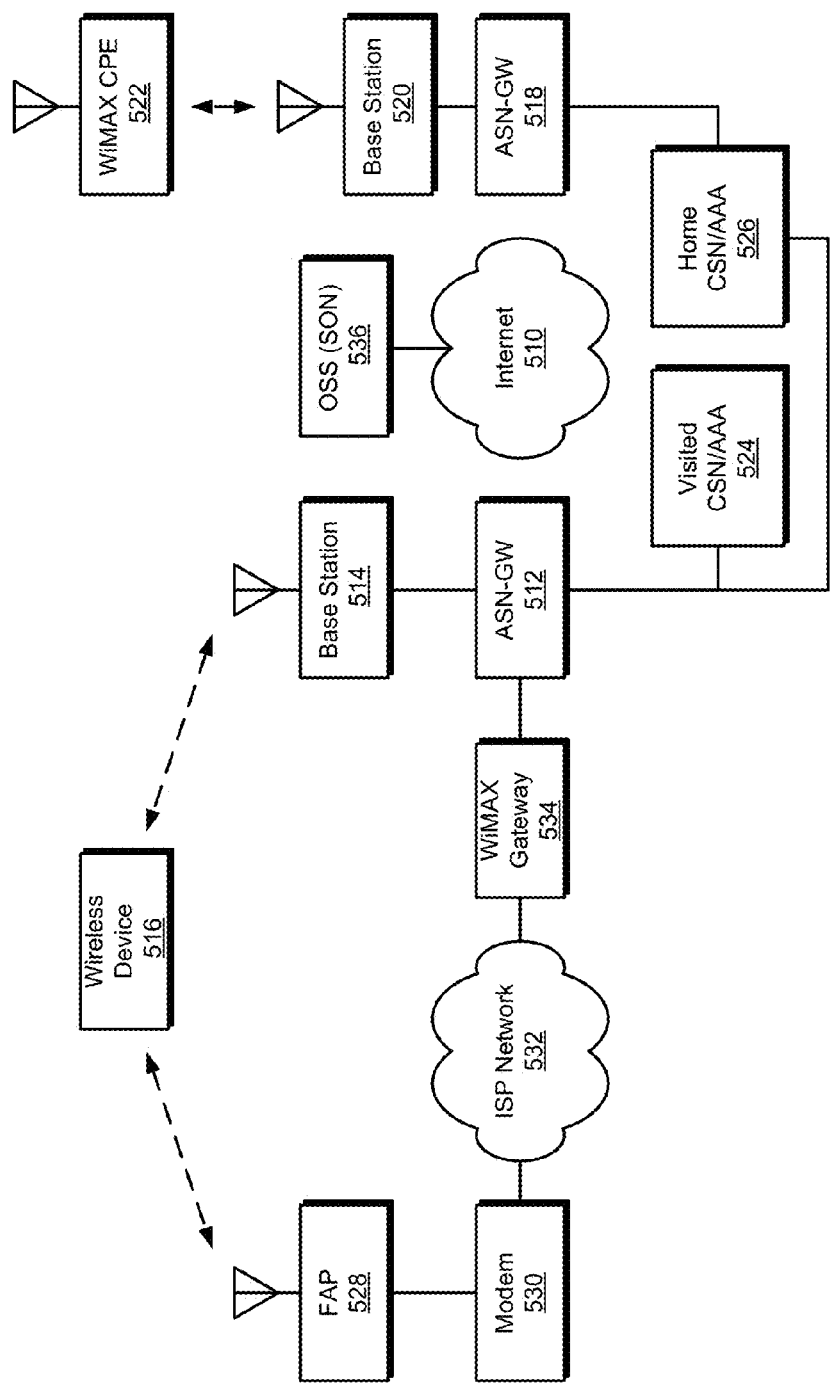
FIG. 5 is a schematic illustration of a wireless networking environment, according to some embodiments.

FIG. 5 is a schematic illustration of a wireless networking environment, according to some embodiments. Referring to FIG. 5, a block diagram of a wireless wide area network in accordance with one or more embodiments will be discussed. As shown in FIG. 5, network 500 may be an internet protocol (IP) type network comprising an Internet 510 type network or the like that is capable of supporting mobile wireless access and/or fixed wireless access to internet 510. In one or more embodiments, network 500 may be in compliance with a Worldwide Interoperability for Microwave Access (WiMAX) standard or future generations of WiMAX, and in one particular embodiment may be in compliance with an Institute for Electrical and Electronics Engineers 802.16 standard (IEEE 802.16-2009). In one or more alternative embodiments network 500 may be in compliance with a Third Generation Partnership Project Long Term Evolution (3GPP LTE) or a 3GPP2 Air Interface Evolution (3GPP2 AIE) standard, and/or a future generation cellular broadband network standard. In general, network 500 may comprise any type of orthogonal frequency division multiple access (OFDMA) based wireless network, and the scope of the claimed subject matter is not limited in these respects. As an example of mobile wireless access, access service network gateway (ASN-GW) 512 is capable of coupling with base station (BS) 514 to provide wireless communication between wireless device (SS) 516 and Internet 510. Wireless device 516 may comprise a mobile type device or information handling system capable of wirelessly communicating via network 500, for example a notebook type computer, a cellular telephone, a personal digital assistant, or the like. ASN-GW 512 may implement profiles that are capable of defining the mapping of network functions to one or more physical entities on network 500. Base station 514 may comprise radio equipment to provide radio-frequency (RF) communication with wireless device 516, and may comprise, for example, the physical layer (PHY) and media access control (MAC) layer equipment in compliance with an IEEE 802.16-2009 type standard. Alternatively, base station 512 may also be referred to as a base transceiver station (BTS) in one or more embodiments. Base station 514 may further comprise an IP backplane to couple to Internet 510 via ASN-GW 512, although the scope of the claimed subject matter is not limited in these respects.

Network 500 may further comprise a visited connectivity service network/authentication, authorization, and accounting (CSN/AAA) server 524 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VOIP) gateways, and/or internet protocol (IP) type server functions, or the like. However, these are merely example of the types of functions that are capable of being provided by visited CSN/AAA or home CSN/AAA 526, and the scope of the claimed subject matter is not limited in these respects. Visited CSN/AAA 524 may be referred to as a visited CSN/AAA in the case for example where visited CSN/AAA 524 is not part of the regular service provider of wireless device 516, for example where wireless device 516 is roaming away from its home CSN/AAA such as home CSN/AAA 526, or for example where network 500 is part of the regular service provider of wireless device but where network 500 may be in another location or state that is not the main or home location of wireless device 516. In a fixed wireless arrangement, WiMAX type customer premises equipment (CPE) 522 may be located in a home or business to provide home or business customer broadband access to internet 510 via base station 520, ASN-GW 518, and home CSN/AAA 526 in a manner similar to access by wireless device 516 via base station 514, ASN-GW 512, and visited CSN/AAA 524, a difference being that WiMAX CPE 522 is generally disposed in a stationary location, although it may be moved to different locations as needed, whereas wireless device may be utilized at one or more locations if wireless device 516 is within range of base station 514 for example. In accordance with one or more embodiments, operation support system, self organizing networks (OSS (SON)) sever 536 may be part of network 500 to provide management functions for network 500 and to provide interfaces between functional entities of network 500. Network 500 of FIG. 5 is merely one type of wireless network showing a certain number of the components of network 500, however the scope of the claimed subject matter is not limited in these respects.

Thus, described herein is an integrated transmit/receive switch which may achieve high power handling capability without the use of series switches. In some embodiments the input power P1 may be up to or greater than 38 dBm. In addition, the switch construction provides strong isolation (i.e., 35 dB) from the transmitter to the receiver and a low insertion loss (e.g., less than 1 dB). Further, the switch construction provides a high bandwidth response (i.e., greater than 15%) and operates well at high frequencies (i.e., 6 GHz) and exhibits high pass response in the receiver.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A transmit/receive switching module, comprising:
   a transmit network connected between a power amplifier and an antenna, wherein the transmit network comprises at least a first switch that switches between a first position which establishes a high impedance RLC circuit in the transmit network and a second position in which the transmit network is in a low-impedance state;
   a receive network connected between the antenna and a low noise amplifier, wherein the receive network comprises at least a second switch that switches between a first position which establishes a high impedance RLC circuit in the receive path network and a second position in which the receive path network is in a low-impedance state; and
   at least two grounding switches connected in parallel and coupled to the at least a second switch.

2. The transmit/receive switching module of claim 1, wherein the high impedance RLC circuit established in the transmit network effectively decouples the transmit network from the antenna such that signals from the power amplifier are blocked from reaching the antenna.

3. The transmit/receive switching module of claim 1, wherein the at least a second switch is open when the transmit/receive switching module is in a receive state, such that signals from the antenna are transmitted via the receive network to a low noise amplifier.

4. The transmit/receive switching module of claim 1, wherein:
   the transmit network comprises a first line and a second line coupled to the power amplifier;

the transmit network is coupled to the antenna via a first inductive link connected to the first line and second line; and the at least a first switch selectively connects the first line and the second line by one or more capacitors positioned between the inductive link and the first amplifier to establish the high impedance RLC circuit in the transmit network.

5. The transmit/receive switching module of claim 1, wherein the high impedance RLC circuit established in the receive network when the at least a second switch is closed effectively decouples the receive network from the antenna such that signals from the antenna are effectively blocked from being transmitted via the receive path.

6. The transmit/receive switching module of claim 1, wherein the at least a first switch is open when the apparatus is in a transmit state, such that signals from the power amplifier are transmitted via the transmit path network to the antenna.

7. The transmit/receive switching module of claim 1, wherein:

the receive network comprises a third line and fourth line coupled to the antenna;

the receive network is coupled to a low noise amplifier via a second inductive link connected to the third line and the fourth line; and the at least a second switch selectively connects the third line and the fourth line by one or more capacitors positioned between the inductive link and the antenna to establish the high impedance RLC circuit in the receive network.

8. The transmit/receive switching module of claim 7, wherein the receive network comprises a fifth line and sixth line coupled to the low noise amplifier, wherein the third line and the fourth line are coupled to the fifth line and the sixth line via the second inductive link, wherein the fifth line and the sixth line are input to the low noise amplifier.

9. A method to switch a transmit/receive module comprising a transmit network and a receive network between a transmit state and a receive state, comprising:

closing at least a first switch in the transmit network to establish a high-impedance RLC circuit in the transmit network to effectively decouple the transmit path network from an antenna; and opening at least a second switch in the receive network such that signals from the antenna are transmitted via the receive path network to a low noise amplifier; and closing at least two grounding switches connected in parallel in the receive network to connect the low noise amplifier to a ground.

10. The method of claim 9, wherein the high impedance RLC circuit established in the transmit network when the at least a first switch is closed blocks signals from the power amplifier from reaching the antenna.

11. A method to switch a transmit/receive module comprising a transmit network and a receive network between a receive state and a transmit state, comprising:

opening at least a first switch in the transmit network such that signals from the power amplifier are transmitted via the transmit path network to an antenna;

closing at least a second switch in the receive network to establish a high-impedance RLC circuit in the receive path network to effectively decouple the receive path network from the antenna; and opening at least two grounding switches connected in parallel in the receive network to disconnect the low noise amplifier from a ground.

12. The method of claim 11, wherein the high impedance RLC circuit established in the receive path network when the at least a second switch is closed blocks signals from the antenna from reaching a low noise amplifier.

13. A radio frequency (RF) communication capability, comprising:

an input/output (I/O) block to receive signals from one or more components of an electronic device;

a baseband processor communicatively coupled to the I/O block to process the signals from the one or more components of an electronic device;

a digital-to-analog (D/A) converter communicatively coupled to an output of the baseband processor;

an analog-to-digital (A/D) converter communicatively coupled to an input of the baseband processor;

an RF modulator/demodulator communicatively coupled to an output of the D/A converter and to an input of the A/D converter;

a power amplifier communicatively coupled to an output of the RF modulator/demodulator;

a low-noise amplifier communicatively coupled to an input of the RF modulator/demodulator; and a transmit/receive switching module communicative coupled to an output of the power amplifier, an input of the low-noise amplifier, and to one or more antennas, the transmit/receive switching module comprising:

a transmit network connected between a power amplifier and an antenna, wherein the transmit network comprises at least a first switch that switches between a first position which establishes a high impedance RLC circuit in the transmit network and a second position in which the transmit network is in a low-impedance state;

a receive network connected between the antenna and a low noise amplifier, wherein the receive network comprises at least a second switch that switches between a first position which establishes a high impedance RLC circuit in the receive path network and a second position in which the receive path network is in a low-impedance state; and at least two grounding switches connected in parallel and coupled to the at least a second switch.

14. The RF communication capability of claim 13, wherein the at least a first switch is open when the RF communication capability is in a transmit state, such that signals input to the power amplifier from the RF modulator/demodulator are transmitted via the transmit path network to the one or more antennas.

15. The RF communication capability of claim 13, wherein the at least a second switch is open when the apparatus is in a receive state, such that signals from the one or more antennas are transmitted via the receive network to the low noise amplifier.

16. The RF communication capability of claim 13, wherein:

the transmit network comprises a first line and a second line coupled to the power amplifier;

the transmit network is coupled to the antenna via a first inductive link connected to the first line and second line; and the at least a first switch selectively connects the first line and the second line by one or more capacitors positioned between the inductive link and the first amplifier to establish the high impedance RLC circuit in the transmit network.

17. The RF communication capability of claim 13, wherein the high impedance RLC circuit established in the receive network when the at least a second switch is closed effectively decouples the receive network from the antenna such that signals from the antenna are effectively blocked from being transmitted via the receive network.

18. The RF communication capability of claim 13, wherein the at least a first switch is open when the apparatus is in a transmit state, such that signals from the power amplifier are transmitted via the transmit path network to the antenna.

19. The RF communication capability of claim 13, wherein:
the receive network comprises a third line and fourth line coupled to the antenna;
the receive network is coupled to a low noise amplifier via a second inductive link connected to the third line and the fourth line; and
the at least a second switch selectively connects the third line and the fourth line by one or more capacitors positioned between the inductive link and the antenna to establish the high impedance RLC circuit in the receive path network.

20. The RF communication capability of claim 19, wherein the receive network comprises a fifth line and sixth line coupled to the low noise amplifier, wherein the third line and the fourth line are coupled to the fifth line and the sixth line via the second inductive link, wherein the fifth line and the sixth line are input to the low noise amplifier.

21. The RF communication capability of claim 20, further comprising at least a third switch to selectively connect the fifth line to a ground and at least a fourth switch assembly to selectively connect the sixth line to ground.

22. The RF communication capability of claim 21, wherein the at least a third switch and the at least a fourth switch are positioned between the second inductive link and the low noise amplifier.

\* \* \* \* \*